United States Patent

Hanna et al.

(10) Patent No.: US 9,174,274 B2
(45) Date of Patent: Nov. 3, 2015

(54) LOW MASS MULTI-PIECE SOUND DAMPENED ARTICLE

(75) Inventors: Michael D. Hanna, West Bloomfield, MI (US); Richard M. Kleber, Clarkston, MI (US); Mohan Sundar, Troy, MI (US); Thomas C. Zebehazy, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2084 days.

(21) Appl. No.: 12/183,104

(22) Filed: Jul. 31, 2008

(65) Prior Publication Data

US 2009/0020379 A1    Jan. 22, 2009

Related U.S. Application Data

(63) Continuation-in-part of application No. 11/440,893, filed on May 25, 2006, now Pat. No. 7,594,568.

(60) Provisional application No. 60/956,452, filed on Aug. 17, 2007.

(51) Int. Cl.
  *F16D 65/12*    (2006.01)
  *B22D 19/00*    (2006.01)
  *F16D 65/02*    (2006.01)

(52) U.S. Cl.
  CPC ............. *B22D 19/00* (2013.01); *F16D 65/12* (2013.01); *F16D 2065/1316* (2013.01); *F16D 2065/1328* (2013.01); *F16D 2065/1344* (2013.01); *F16D 2200/003* (2013.01); *F16D 2200/0013* (2013.01); *F16D 2250/0015* (2013.01)

(58) Field of Classification Search
  USPC .......................... 188/218 XL; 301/6.8, 105.1
  See application file for complete search history.

(56) References Cited

U.S. PATENT DOCUMENTS

| | | |
|---|---|---|
| 974,024 A | 10/1910 | Carter |
| 1,484,421 A | 2/1924 | Thomspon |
| 1,989,211 A | 1/1935 | Norton |
| 2,012,838 A | 8/1935 | Tilden |
| 2,026,878 A | 1/1936 | Farr |

(Continued)

FOREIGN PATENT DOCUMENTS

| | | |
|---|---|---|
| CH | 428319 A | 1/1967 |
| CN | 2005/10113784 | 10/2005 |

(Continued)

OTHER PUBLICATIONS

Chinese Patent Office First Office Action, Patent Application No. 200510113784.x, Date of Issue of OA: May 18, 2007; 41 pages.

(Continued)

*Primary Examiner* — Robert A Siconolfi
*Assistant Examiner* — James Hsiao
(74) *Attorney, Agent, or Firm* — BrooksGroup

(57) ABSTRACT

A multi-piece sound dampened brake rotor comprises a relatively light weight hub with a hub flange and a heavier rotor body with a sound damping insert and a rotor body flange. The hub and rotor body are attached at their flanges. The flanges may be mechanically attached such as with bolts. Or the hub and rotor may be attached by casting the hub of a lower melting metal alloy against the rotor body and rotor body flange. The rotor body may have vanes for air cooling and a sound damping insert may be incased in either or both body portions sandwiching the vanes.

2 Claims, 2 Drawing Sheets

(56) References Cited

U.S. PATENT DOCUMENTS

| | | | |
|---|---|---|---|
| 2,288,438 A | 6/1942 | Dach | |
| 2,603,316 A | 7/1952 | Pierce | |
| 2,978,793 A | 4/1961 | Lamson et al. | |
| 3,085,391 A | 4/1963 | Hatfield et al. | |
| 3,127,959 A | 4/1964 | Wengrowski | |
| 3,147,828 A | 9/1964 | Hunsaker | |
| 3,286,799 A * | 11/1966 | Shilton | 188/218 R |
| 3,292,746 A | 12/1966 | Robinette | |
| 3,378,115 A | 4/1968 | Stephens, III | |
| 3,425,523 A | 2/1969 | Robinette | |
| 3,509,973 A | 5/1970 | Kimata | |
| 3,575,270 A * | 4/1971 | Wagenfuhrer et al. | 192/107 R |
| 3,774,472 A | 11/1973 | Mitchell | |
| 3,841,448 A | 10/1974 | Norton, Jr. | |
| 3,975,894 A | 8/1976 | Suzuki | |
| 4,049,085 A | 9/1977 | Blunier | |
| 4,072,219 A | 2/1978 | Hahm et al. | |
| 4,195,713 A | 4/1980 | Hagbjer et al. | |
| 4,250,950 A | 2/1981 | Buxmann et al. | |
| 4,278,153 A | 7/1981 | Venkatu | |
| 4,281,745 A | 8/1981 | Wirth | |
| 4,338,758 A | 7/1982 | Hagbjer | |
| 4,379,501 A | 4/1983 | Hagiwara et al. | |
| 4,475,634 A | 10/1984 | Flaim et al. | |
| 4,523,666 A | 6/1985 | Murray | |
| 4,529,079 A | 7/1985 | Albertson | |
| 4,645,041 A * | 2/1987 | Bass | 188/218 XL |
| 4,905,299 A | 2/1990 | Ferraiuolo et al. | |
| 5,004,078 A | 4/1991 | Oono et al. | |
| 5,005,676 A * | 4/1991 | Gassiat | 188/218 XL |
| 5,025,547 A | 6/1991 | Sheu et al. | |
| 5,083,643 A | 1/1992 | Hummel et al. | |
| 5,115,891 A | 5/1992 | Raitzer et al. | |
| 5,139,117 A | 8/1992 | Melinat | |
| 5,143,184 A | 9/1992 | Snyder et al. | |
| 5,183,632 A | 2/1993 | Kluchi et al. | |
| 5,184,662 A | 2/1993 | Quick et al. | |
| 5,259,486 A | 11/1993 | Deane | |
| 5,310,025 A | 5/1994 | Anderson | |
| 5,416,962 A | 5/1995 | Passarella | |
| 5,417,313 A | 5/1995 | Matsuzaki et al. | |
| 5,509,510 A | 4/1996 | Ihm | |
| 5,530,213 A | 6/1996 | Hartsock et al. | |
| 5,582,231 A | 12/1996 | Siak et al. | |
| 5,620,042 A | 4/1997 | Ihm | |
| 5,660,251 A | 8/1997 | Nishizawa et al. | |
| 5,789,066 A | 8/1998 | DeMare et al. | |
| 5,810,123 A * | 9/1998 | Giorgetti et al. | 188/218 XL |
| 5,819,882 A | 10/1998 | Reynolds et al. | |
| 5,855,257 A | 1/1999 | Wickert et al. | |
| 5,862,892 A * | 1/1999 | Conley | 188/218 XL |
| 5,878,843 A * | 3/1999 | Saum | 188/218 XL |
| 5,927,447 A | 7/1999 | Dickerson | |
| 5,965,249 A | 10/1999 | Sutton et al. | |
| 6,047,794 A | 4/2000 | Nishizawa | |
| 6,053,290 A * | 4/2000 | Goddard | 73/861.73 |
| 6,073,735 A | 6/2000 | Botsch et al. | |
| 6,112,865 A | 9/2000 | Wickert et al. | |
| 6,206,150 B1 | 3/2001 | Hill | |
| 6,216,827 B1 | 4/2001 | Ichiba et al. | |
| 6,223,866 B1 | 5/2001 | Giacomazza | |
| 6,231,456 B1 | 5/2001 | Rennie et al. | |
| 6,241,055 B1 * | 6/2001 | Daudi | 188/73.35 |
| 6,241,056 B1 | 6/2001 | Cullen et al. | |
| 6,283,258 B1 | 9/2001 | Chen et al. | |
| 6,302,246 B1 | 10/2001 | Naumann et al. | |
| 6,357,557 B1 * | 3/2002 | Di Ponio | 188/18 A |
| 6,367,598 B1 | 4/2002 | Sporzynski | |
| 6,405,839 B1 | 6/2002 | Ballinger et al. | |
| 6,465,110 B1 * | 10/2002 | Boss et al. | 428/608 |
| 6,481,545 B1 | 11/2002 | Yano et al. | |
| 6,505,716 B1 | 1/2003 | Daudi et al. | |
| 6,507,716 B2 | 1/2003 | Nomura et al. | |
| 6,543,518 B1 | 4/2003 | Bend et al. | |
| 6,648,055 B1 | 11/2003 | Haug et al. | |
| 6,799,664 B1 | 10/2004 | Connolly | |
| 6,880,681 B2 | 4/2005 | Koizumi et al. | |
| 6,890,218 B2 | 5/2005 | Patwardhan et al. | |
| 6,899,158 B2 | 5/2005 | Matuura et al. | |
| 6,932,917 B2 | 8/2005 | Golden et al. | |
| 6,945,309 B2 | 9/2005 | Frait et al. | |
| 7,066,235 B2 | 6/2006 | Huang | |
| 7,112,749 B2 | 9/2006 | DiPaola et al. | |
| 7,178,795 B2 | 2/2007 | Huprikar et al. | |
| 7,219,777 B2 | 5/2007 | Lin | |
| 7,293,755 B2 | 11/2007 | Miyahara et al. | |
| 7,380,645 B1 | 6/2008 | Ruiz | |
| 7,568,560 B2 | 8/2009 | Lin | |
| 7,594,568 B2 | 9/2009 | Hanna et al. | |
| 7,604,098 B2 | 10/2009 | Dessouki et al. | |
| 7,644,750 B2 | 1/2010 | Schroth et al. | |
| 7,775,332 B2 | 8/2010 | Hanna et al. | |
| 7,836,938 B2 | 11/2010 | Agarwal et al. | |
| 7,850,251 B1 * | 12/2010 | Sadanowicz | 301/6.8 |
| 2002/0007928 A1 | 1/2002 | Guetlbauer et al. | |
| 2002/0084156 A1 | 7/2002 | Ballinger et al. | |
| 2002/0104721 A1 * | 8/2002 | Schaus et al. | 188/218 XL |
| 2003/0037999 A1 | 2/2003 | Tanaka et al. | |
| 2003/0127297 A1 | 7/2003 | Smith et al. | |
| 2003/0141154 A1 | 7/2003 | Rancourt et al. | |
| 2003/0213658 A1 | 11/2003 | Baba | |
| 2004/0031581 A1 | 2/2004 | Herreid et al. | |
| 2004/0045692 A1 | 3/2004 | Redemske | |
| 2004/0074712 A1 | 4/2004 | Quaglia et al. | |
| 2004/0084260 A1 * | 5/2004 | Hoyte et al. | 188/218 XL |
| 2004/0242363 A1 | 12/2004 | Kohno et al. | |
| 2005/0011628 A1 | 1/2005 | Frait et al. | |
| 2005/0150222 A1 | 7/2005 | Kalish et al. | |
| 2005/0183909 A1 | 8/2005 | Rau, III et al. | |
| 2005/0193976 A1 | 9/2005 | Suzuki et al. | |
| 2006/0076200 A1 * | 4/2006 | Dessouki et al. | 188/218 XL |
| 2006/0243547 A1 | 11/2006 | Keller | |
| 2007/0039710 A1 | 2/2007 | Newcomb | |
| 2007/0056815 A1 | 3/2007 | Hanna et al. | |
| 2007/0062664 A1 | 3/2007 | Schroth et al. | |
| 2007/0062768 A1 | 3/2007 | Hanna et al. | |
| 2007/0119667 A1 | 5/2007 | Hanna et al. | |
| 2007/0142149 A1 | 6/2007 | Kleber | |
| 2007/0166425 A1 | 7/2007 | Utsugi | |
| 2007/0235270 A1 | 10/2007 | Miskinis et al. | |
| 2007/0298275 A1 | 12/2007 | Carter et al. | |
| 2008/0099289 A1 | 5/2008 | Hanna et al. | |
| 2008/0185249 A1 | 8/2008 | Schroth et al. | |
| 2009/0032569 A1 | 2/2009 | Sachdev et al. | |
| 2009/0056134 A1 | 3/2009 | Kleber et al. | |
| 2009/0107787 A1 | 4/2009 | Walker et al. | |

FOREIGN PATENT DOCUMENTS

| | | |
|---|---|---|
| CN | 20051113784 A | 10/2005 |
| CN | 1757948 A | 4/2006 |
| CN | 2863313 Y | 1/2007 |
| DE | 1230274 B | 12/1966 |
| DE | 24 46 938 | 4/1976 |
| DE | 2446938 A1 | 4/1976 |
| DE | 25 37 038 | 3/1977 |
| DE | 2537038 A1 | 3/1977 |
| DE | 19649919 A1 | 6/1998 |
| DE | 199 48 009 | 3/2001 |
| DE | 19948009 C1 | 3/2001 |
| DE | 60000008 T2 | 3/2002 |
| DE | 101 41 698 | 3/2003 |
| DE | 10141698 A1 | 3/2003 |
| DE | 102005048258 | 10/2005 |
| DE | 102005048258 A1 | 4/2006 |
| DE | 60116780 T2 | 11/2006 |
| EP | 0 205 713 | 12/1986 |
| EP | 0205713 A1 | 12/1986 |
| GB | 1230 274 | 4/1971 |
| GB | 1230274 | 4/1971 |
| GB | 2328952 | 3/1999 |
| JP | 54052576 U | 4/1979 |
| JP | 57154533 | 9/1982 |
| JP | 57154533 A | 9/1982 |

(56) References Cited

FOREIGN PATENT DOCUMENTS

| | | | |
|---|---|---|---|
| JP | 1126434 U1 | 8/1989 | |
| JP | 05-104567 | 4/1993 | |
| JP | 11342461 A | 12/1999 | |
| JP | 2001512763 T | 8/2001 | |
| JP | 2003214465 A | 7/2003 | |
| JP | 2004011841 A | 1/2004 | |
| KR | 20010049837 A | 6/2001 | |
| WO | 9823877 A1 | 6/1998 | |
| WO | WO 98/23877 | 6/1998 | |
| WO | 0136836 A1 | 5/2001 | |
| WO | WO 01/36836 | 5/2001 | |
| WO | 2007035206 A2 | 3/2007 | |

OTHER PUBLICATIONS

Chinese Patent Office Second Office Action, Patent Application No. 200510113784.x, Date of Issue of OA: Feb. 15, 2008; 13 pages.
German Examination of Patent Application No. 10 2005 048 258.9; Dated Oct. 22, 200.
Magnetorheological fluid/ Wikipedia article; http://en.wikipedia.org/wiki/Magnetorheologica.
U.S. Appl. No. 12/420,259; Brake Rotor With Intermediate Portion, filed Apr. 8, 2009; Inventor: Michael D. Hanna.
U.S. Appl. No. 12/789,841; Interconnection for Cast-In-Place Components, filed May 28, 2010; Inventor: Richard M. Kleber.
Gerdemann, Steven J,; Titanium Process Technologies; Advanced Materials & Processes, Jul. 2001, pp. 41-43.
Mahoney, M. W. & Lynch S. P.; Friction-Stir Processing; 15 pages.
MPIF: All You Need to Know about Powder Metallurgy; http://www.mpif.org/IntroPM/intropm/asp?linkid=1; 8 pages.
Powder Metallurgy—Wikipedia article; http://en.wikipedia.org/wiki/Powder_metallurgy; 5 pages.
Sintering—Wikipedia article; http://en.wikipedia.org/wiki/Sintering; 2 pages.
PCT/US2008/087354 Written Opinion and Search Report; Date of Mailing: Aug. 3, 2009; 9 pages.
PCT/US2009/039839 Written Opinion and Search Report; Date of Mailing: Nov. 24, 2009; 7 pages.
PCT/US2009/048424 Written Opinion and Search Report; Date of Mailing; Dec. 28, 2009; 7 pages.
U.S. Appl. No. 12/328,989, filed Dec. 5, 2008; First Named Inventor: Patrick J. Monsere.
U.S. Appl. No. 12/420,259, filed Apr. 8, 2009; First Named Inventor: Michael D. Hanna.
U.S. Appl. No. 12/434,057, filed May 1, 2009; First Named Inventor: Chongmin Kim.
U.S. Appl. No. 12/436,830, filed May 7, 2009; First Named Inventor: James G. Schroth.
U.S. Appl. No. 12/489,901, filed Jun. 23, 2009; First Named Inventor: Michael D. Hanna.
U.S. Appl. No. 12/885,813, filed Sep. 20, 2010; First Named Inventor: Michael D. Hanna.
International Search Report dated Apr. 2, 2007 for International Application No. PCT US06/29687, Publication No. WO 2007/040768; GM Global Technology Operations, Inc.
Omar Dessouki, George Drake, Brent Lowe, Wen Kuei Chang, General Motors Corp: Disc Brake Squeal: Diagnosis & Prevention. 03NVC-224; Society of Automotive Engineer, Inc. 2002.
Z. Wu, C. Richter, L. Menon, A Study of Anodization Process During Pore Formation in Nanoporous Alumina Templates, Journal of the Electrochemical Society, vol. 154, 2007.
W.-J. Lee, M. Alhoshan, W.H. Smyrl, Titanium Dioxide Nanotube Arrays Fabricated by Anodizing Processes, Journal of the Electrochemical Society, vol. 153, 2006, pp. B499-B505.
I.V. Sieber, P. Schmuki, Porous Tantalum Oxide Prepared by Electrochemical Anodic Oxidation, Journal of the Electrochemical Society, vol. 152, 2005, pp. C639-C644.
H. Tanaka, A. Shimada, A. Kinoshita, In situ Measurement of the Diameter of Nanopores in Silicon During Anodization in Hydrofluoric Acid Solution, Journal of the Electrochemic.
L.G. Hector, Jr., S. Sheu, Focused Energy Beam Work Roll Surface Texturing Science and Technology, Journal of Materials Processing & Manufacturing Science, vol. 2, Jul. 1993.
P.N. Anyalebechi, Ungrooved Mold Surface Topography Effects on Cast Subsurface Microstructure, Materials Processing Fundamentals, TMS 2007, pp. 49-62.
F. Yigit, Critical Wavelengths for Gap Nucleation in Solidification—Part 1: Theoretical Methodology, Journal of Applied Mechanics, vol. 67, Mar. 2000, pp. 66-76.
P.N. Anyalebechi, Undulatory Solid Shell Growth of Aluminum Alloy 3003 as a Function of the Wavelength of a Grooved Mold Surface Topography, TMS 2007, pp. 31-47.
Dessouki et al., U.S. Appl. No. 10/961,813, Coulomb friction damped disc brake rotors, filed Oct. 8, 2004.
Hanna et al., U.S. Appl. No. 11/475,756, Bi-metal disc brake rotor and method of manufacturing, filed Jun. 27, 2006.
Schroth et al., U.S. Appl. No. 11/475,759, Method of casting components with inserts for noise reduction, filed Jul. 27, 2006.
Schroth et al., U.S. Appl. No. 12/025,967, Damped products and methods of making and using the same, filed Feb. 5, 2008.
Hanna et al., U.S. Appl. No. 11/440,916, Bi-metal disc brake rotor and method of manufacture, filed May, 25, 2006.
Hanna et al., U.S. Appl. No. 11/554,234, Coulomb damped disc brake rotor and method of manufacturing, filed Oct. 30, 2006.
Walker et al., U.S. Appl. No. 11/926,798, Inserts with holes for damped products and methods of making and using the same, filed Oct. 29, 2007.
Hanna et al., U.S. Appl. No. 11/832,401, Damped product with insert and method of making the same, filed Aug. 1, 2007.
Kleber, et al., U.S. Appl. No. 11/848,732, Cast-in-place torsion joint, filed Aug. 31, 2007.
Hanna et al., U.S. Appl. No. 11/780,679, Method of manufacturing a damped part, filed Jul. 20, 2007.
Aase et al., U.S. Appl. No. 11/969,259, Method of forming casting with frictional damping insert, filed Jan. 4, 2008.
Hanna et al., U.S. Appl. No. 12/165,729, Method for securing an insert in the manufacture of a damped part, filed Jul. 1, 2008.
Hanna et al., U.S. Appl. No. 12/165,731, Product with metallic foam and method of manufacturing the same, filed Jul. 1, 2008.
Agarwal et al., U.S. Appl. No. 11/860,049, Insert with tabs and damped products and methods of making the same, filed Sep. 24, 2007.
Hanna et al., U.S. Appl. No. 12/174,163, Damped part, filed Jul. 16, 2008.
Hanna et al., U.S. Appl. No. 12/174,223, Method of casting damped part with insert, filed Jul. 16, 2008.
Hanna et al., U.S. Appl. No. 12/183,180, Casting noise-damped, vented brake rotors with embedded inserts, filed Jul. 31, 2008.
Golden et al., U.S. Appl. No. 12/105,411, Insert with filler to dampen vibrating components, filed Apr. 18, 2008.
Hanna et al., U.S. Appl. No. 11/440,893, Rotor assembly and method, filed May 25, 2006.
Carter, U.S. Appl. No. 11/680,179, Damped automotive components with cast in place inserts and method of making same, filed Feb. 28, 2007.
Ulicny et al., U.S. Appl. No. 12/105,438, Filler material to dampen vibrating components, filed Apr. 18, 2008.
Hanna et al., U.S. Appl. No. 12/272,164, Surface configurations for damping inserts, filed Nov. 17, 2008.
Hanna et al., U.S. Appl. No. 12/145,169, Damped product with an insert having a layer including graphite thereon and methods of making and using the same, filed Jun. 24, 2008.
Lowe et al., U.S. Appl. No. 12/174,320, Damped part with insert, filed Jul. 16, 2008.
Xia, U.S. Appl. No. 12/858,596, Lightweight brake rotor and components with composite materials, filed Sep. 20, 2007.
Dessouki et al., U.S. Appl. No. 12/178,872, Friction damped brake drum, filed Jul. 24, 2008.
Sachdev et al., U.S. Appl. No. 11/832,356, Friction welding method and products made using the same, filed Aug. 1, 2007.

\* cited by examiner

LOW MASS MULTI-PIECE SOUND DAMPENED ARTICLE

This application is a continuation-in-part of U.S. patent application Ser. No. 11/440,893, titled "Rotor Assembly and Method", filed May 25, 2006. This application claims the benefit of U.S. Provisional Application No. 60/956,452, titled "Low Mass Multi-Piece Sound Dampened Article", filed Aug. 17, 2007. The disclosures of the above applications are incorporated herein by reference.

TECHNICAL FIELD

This disclosure pertains to a first article of a durable and relatively heavy material joined to a second article made of a lower density material. This disclosure illustrates an embodiment when the durable article is a ferrous metal annular brake rotor body comprising one or more inserts for coulomb friction damping, and the lighter weight part is an aluminum or magnesium alloy hub for the brake rotor.

BACKGROUND OF THE INVENTION

Automotive vehicle disc brake rotors are an example of a manufactured article that may comprise a cast iron (or other durable, friction wear material) annular rotor body attached to a lower density metal hub. Of course, many other manufactured articles comprise, or could comprise, a relatively heavy and durable component that is subjected to loading stress and wear, and a lighter component serving another function.

In the case of the vehicle disc brake rotor, a hub is used to attach the rotor body to a vehicle wheel. The hub may be a round cylindrical body (sometimes shaped like a hat) attached to the wheel and aligned with the axis of rotation of the wheel. Attached to the bottom of the hat (for example) and extending radially outwardly is the annular rotor body or disc (brake frictional surface). In operation of the vehicle a hydraulically or electrically actuated brake caliper member, positioned around the outer circumferential edge of the rotor, presses friction pads against opposite sides (cheeks) of the annular rotor disc when it is desired to stop rotation of the wheel. The complimentary hub and rotor body portions of such brake rotors may be cast of a single metal alloy and formed as an integral article. Or the portion subjected to wear may be formed separately of a suitable metal composition and later attached to the complementary portion made of a lighter material. Thus, a complete and integral brake rotor may be formed, for example, of cast iron, or the rotor portion may be made of cast iron and the hub be made of an aluminum or magnesium alloy. An advantage of forming such an article of a relatively heavy and durable portion and a lighter material portion is the overall weight of the article may be reduced.

A brake disc is subject to frictional heating and to induced vibrations when brake pads are pressed against opposite cheeks of the rotating part. Accordingly, the annular rotor body portion of a disc brake may be formed with radial vents so that cooling air may be pumped through the rotating brake body. And sometimes it is desired to incorporate one or more annular inserts in the annular rotor body to produce columbic friction between contacting surfaces of the embedded insert(s) and surrounding rotor body metal to dampen noise otherwise transmitted by the vibrating brake rotor. These additional structural features of the annular rotor body have significantly complicated the manufacture of low mass articles such as vented and sound dampened brake rotors.

SUMMARY OF THE INVENTION

This disclosure pertains to multi-piece articles with immersed inserts in one of the pieces of the article.

In an embodiment of the disclosure, a multi-piece brake rotor is provided. In another embodiment of the disclosure the brake rotor comprises a hub formed of a cast low density metal alloy such as, but not limited to, an aluminum, titanium, or magnesium alloy. The hub is shaped for attachment to a vehicle wheel and for rotation coaxially with the wheel. The hub comprises a flange (e.g., a circumferential flange) for attachment to a radially extending annular rotor body with parallel radial faces (sometimes called cheeks) to be engaged by friction pads in a braking operation. The rotor body may be cast iron and may comprise at least one annular sound damping insert enclosed in the annular rotor body parallel to a brake cheek or radial face. The rotor body also comprises a flange portion or other structural feature for attachment with a hub in making the multi-piece brake rotor. The sound damping insert has at least one face in coulombic frictional contact with adjacent internal faces of the enclosing rotor body. The surfaces of the insert or of the body may have a coating of, for example, particulate material acting at the interfaces of the insert surface and body surface for enhancement of coulombic friction sound damping within the rotor body.

In another embodiment the rotor body may comprise radial vent passages defined by radial vanes separating two parallel annular body sections. In this embodiment the vanes and sandwiching body portions may be an integral cast body. In an embodiment of this type a sound damping insert may be located in either or both of the facing annular rotor body sections. The rotor body may have a circumferential edge surface characterized by the outer ends of the vanes the outer edges of the two parallel body portions and, if desired, the outer circumferential edge of a sound damping insert.

In another embodiment of the disclosure, the hub and rotor body are made separately and assembled such as by mechanical fasteners (e.g., bolts, rivets), or they may be cast separately and then welded together to make a brake rotor. For example, a hub may be cast of an aluminum alloy with a circumferential flange. Such a flange may have a round edge for engagement with a rotor body. Or the flange may have teeth or other projections for an interlocking attachment with a rotor body to withstand torsional forces produced at a hub-rotor body interface during vehicle braking.

In one embodiment, an annular rotor body (brake frictional surface) with one or more sound damping inserts may be made by a casting operation. For example, one or more stamped steel annular inserts with refractory or non-refractory particle surface coatings are positioned in a sand mold and sand core casting assembly providing casting cavity surfaces for forming the annular rotor body around the insert(s). Molten cast iron is poured into the mold, flowing around suitably anchored steel inserts and, upon cooling, an iron annular rotor body with integral embedded steel inserts is obtained. The cleaned and trimmed cast rotor body is ready for attachment to a hub. Overlapping or otherwise interconnecting hub and rotor body flanges may be bolted together through corresponding arcuately spaced holes in their flanges. Other attachment practices, such as welding, casting, or riveting, may also be used to rigidly attach the brake hub and annular rotor body pieces.

In other embodiment of the invention, an annular rotor body is prepared generally as described in the above paragraph. In this embodiment the rotor body flange is shaped for an interlocking or overlapping engagement with a subsequently cast hub formed of a lower melting point, lower density castable metal composition. The annular rotor body is placed in a supporting mold with a surrounding mold cavity defining the shape of a hub. When the hub alloy material is cast into the mold the hub is formed together with, for example, a hub-flange shape that solidifies against a complementary rotor body flange that yields an interlocking connection between the hub and annular rotor body pieces of the brake rotor.

A practice of the invention has been illustrated in terms of a multi-piece brake rotor. However, it is clear that other multi-piece articles requiring a relatively heavy wear resistant part, including an enclosed insert, and a light weight part may be made by a similar practice. The result is an article of lower weight with good performance characteristics.

Accordingly, other objects and advantages of the content of this disclosure will become apparent from a further description of embodiment which follows with reference to drawings described in the following paragraph.

DESCRIPTION OF PREFERRED EMBODIMENTS

This disclosure illustrates multi-piece articles where one piece contains an immersed or embedded insert. A specific illustrative embodiment is of brake rotors of multi-piece construction comprising a hub and a rotor body. In an embodiment, the rotor body has vanes for air cooling of the rotor and the vented rotor body portions include one or two immersed coulomb friction damping inserts.

Many high performance vehicles use brake rotors with cast iron or steel friction surfaces joined to hub sections of lighter weight materials such as aluminum.

Figure 1:
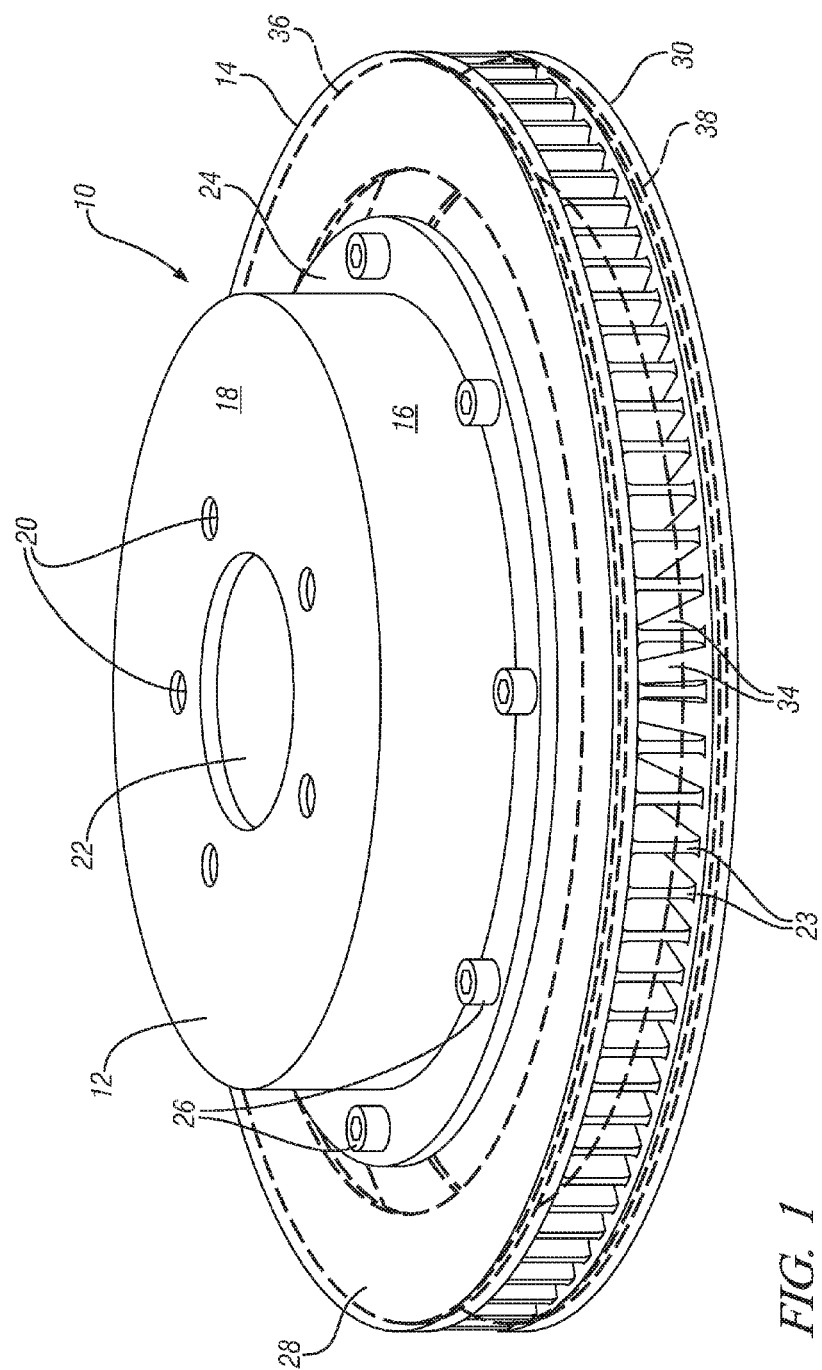
FIG. 1 is an oblique view of a multi-piece vehicle brake rotor which may be made in accordance with one embodiment of this disclosure.

FIG. 1 illustrates a multi-piece brake rotor 10 which comprises hub 12 and rotor body 14. Hub 12 may be a casting made from a suitable aluminum alloy, or other light metal alloy, and rotor body 14 may be a casting made of cast iron with enclosed annular stamped steel insert bodies which will be described in more detail below. In one embodiment, the hub 12 and the annular rotor body 14 may be attached to each other with bolts or other suitable fasteners 26. Brake rotor 10 is adapted and shaped for attachment to a vehicle wheel and for braking of a wheel by engagement of friction pads (not shown) to side cheek surfaces of rotor body 14.

Hub 12 comprises a hollow cylindrical body 16 with an end surface 18. End surface 18 may comprise bolt holes 20 for attachment of brake rotor 10 to a vehicle wheel. End surface 18 may also comprise a central opening 22 for a vehicle axle. Attached to the other end of the hollow cylindrical body 16 is a radially outwardly extending hub flange 24. Hub flange 24 is attached to a flange 44 (better illustrated in FIG. 2) on rotor body 14 with bolts 26. In another embodiment, hub flange 24 is attached to flange 44 by welding.

Rotor body 14 is typically an integral iron casting that comprises an outboard rotor body portion 28 (outboard position when the brake rotor 10 is attached to a vehicle wheel), an inboard body portion 30 and radial vanes 32. Vanes 32 are sandwiched between body portions 28, 30 to provide passages 34 for air flow when a wheel and attached rotor are rotating. In this embodiment of the disclosure, rotor body portions 28, 30 each contain an immersed cast-in-place annular stamped steel insert; insert 36 in body portion 28 and insert 38 in body portion 30. In other embodiments, only one of the rotor body portions 28, contains an insert.

Figure 2:
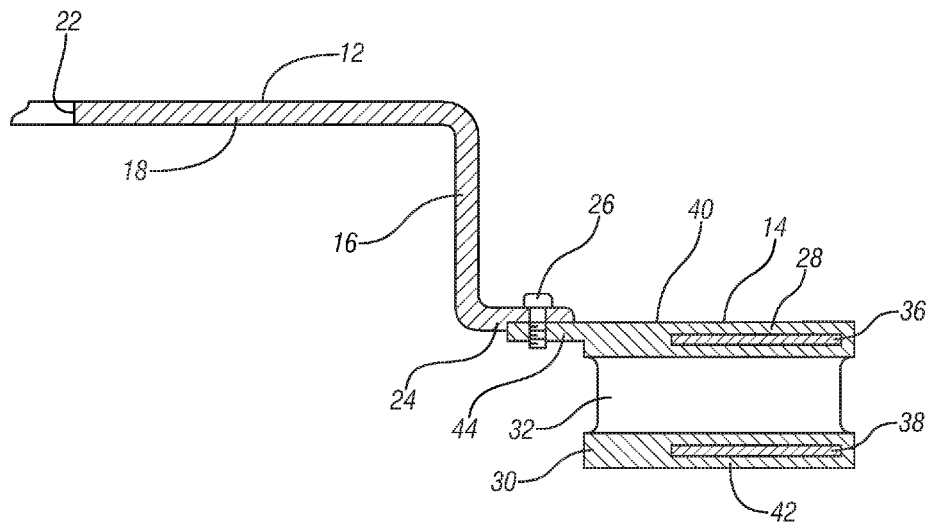
FIG. 2 is radial cross-section of a portion of the bolted connection between the aluminum alloy hub and cast iron rotor of the assembled multi-part brake rotor illustrated in FIG. 1.

FIG. 2 is an illustration of a radial cross-section of a multi piece brake rotor with an aluminum hub portion 12 joined with mechanical fasteners 26 to a cast iron or steel rotor 14. Rotor body portion 28 also has an integral, radially inwardly extending rotor body flange 44 which is rigidly attached to hub flange 24 by bolts 26. This mechanical connection between hub flange 24 and rotor body flange 44 maintains the structural integrity of brake rotor 10 despite torsional loading during vehicle braking.

Annular stamped steel insert 36 is seen to have flat, parallel upper and lower surfaces that lie generally parallel to friction surface 40 (cheek) of outboard body portion 28. Likewise, annular stamped steel insert 38 is seen to have flat, parallel upper and lower surfaces that lie generally parallel to friction surface 42 (cheek) of inboard body portion 30. Such coulomb damping inserts (36, 38) may be immersed or embedded in both rotor body portions 28, 30 or in either one of them. In various embodiments, the insert 36 may be formed of, for example but not limited to, aluminum, stainless steel, cast iron, any of a variety of other alloys, or metal matrix composite.

The annular surfaces of inserts 36, 38 typically have very small (microscopic) hills and valleys (which may be provided or enhanced by a suitable particulate coating, not shown) that interact with the enclosing iron body portions 28, 30 of the rotor to dampen vibrations produced in a revolving rotor by action of friction brake pads pressed against cheeks 40, 42 in braking of a vehicle wheel. In various embodiments, the inserts 36, 38 may have a suitable coating including, for example but not limited to, particles, flakes, or fibers including silica, alumina, graphite with clay, silicon carbide, silicon nitride, cordierite (magnesium-iron-aluminum silicate), mullite (aluminum silicate), zirconia (zirconium oxide), phyllosilicates, or other high-temperature-resistant particles. In various embodiments, the coating over the inserts 36, 38 may have a thickness of ranging from about 1 μm to about 500 μm.

Figure 3:
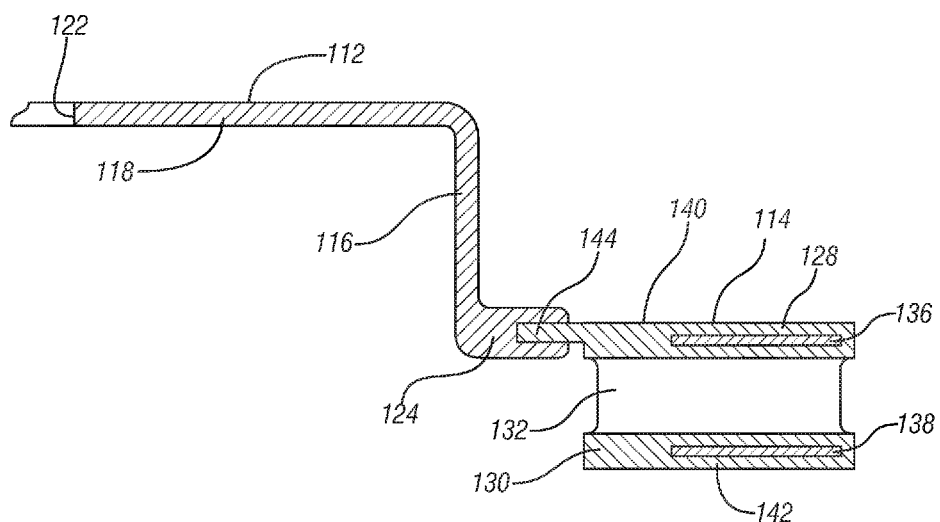
FIG. 3 is a radial cross-section, similar to the cross-section of FIG. 2, illustrating a cast-in-place attachment of an aluminum alloy hub section and a cast iron rotor section of a multi-piece brake rotor similar to the rotor illustrated in FIG. 1.

FIG. 3 is an illustration of a radial cross-section of a multi piece brake rotor 110 with an aluminum hub portion 112 joined with a cast-in-place joint to a cast iron or steel rotor body 114.

Hub 112 comprises a hollow cylindrical body 116 with an end surface 118. End surface 118 may comprise a central opening 122 for a vehicle axle. Attached to the other end of hollow cylindrical body is a radially outwardly extending hub flange 124. Hub flange 124 is formed by casting hub 112 against and around complementary rotor body flange 144. For example, the rotor body 114 may be positioned in a lower tool, and the lower tool may be engaged with an upper tool to form a cavity. Molten material, for example but not limited to aluminum or magnesium alloy, is then introduced into the cavity to form the hub 112 with hub flange 124. Hub flange 124 is formed around and against rotor body flange 144 upon solidification of the molten alloy to form the complete hub shape. A strong cast-in-place bond is thus formed between the hub 112 and the rotor body 114.

As in the embodiment illustrated in FIG. 2, rotor body 114 is typically an integral iron casting that comprises an outboard rotor body portion 128, an inboard body portion 130 and radial vanes 132. Vanes 132 are sandwiched between body portions 128, 130 to provide passages for air flow when a wheel and attached rotor are rotating. Again, in this embodiment of the disclosure, rotor body portions 128, 130 each contain an immersed cast-in-place annular stamped steel insert; insert 136 in body portion 128 and insert 138 in body portion 130. Such coulomb damping inserts (136 and 138) may be immersed in both rotor body portions 128, 130 or in either one of them.

In each of the above examples, the rotor could be a non-vented type that does not include vanes 32 or 132 but has a single solid body portion with at least one coulomb friction damping insert.

Practices of the invention have been shown by examples that are presented as illustrations and not limitations of the invention.

The invention claimed is:

1. A multi-piece, sound dampened brake rotor for attachment to a vehicle wheel, the rotor comprising;
a hub with a round cylindrical body with a partial closure at one end of the cylindrical body providing for attachment of the brake rotor to a vehicle wheel, and a radially outwardly extending hub flange from the cylindrical body; and an annular rotor body comprising a radially internal circumferential surface with a flange, the body extending to an external diameter with an external circumferential surface and having parallel opposing body surfaces for frictional engagement in braking of the vehicle wheel, the rotor body comprising at least one annular insert between the parallel body surfaces and constructed and arranged to provide coulomb friction damping; the hub flange and annular rotor body flange are attached to form the brake rotor and to withstand torsional forces arising from vehicle braking, in which the annular insert has a coating comprising at least one of silica, alumina, graphite with clay, silicon carbide, silicon nitride, cordierite (magnesium-iron-aluminum silicate), mullite (aluminum silicate), zirconia (zirconium oxide), phyllosilicates, or other high-temperature-resistant particles.

2. A multi-piece, sound dampened brake rotor for attachment to a vehicle wheel, the rotor comprising; a hub with a round cylindrical body with a partial closure at one end of the cylindrical body providing for attachment of the brake rotor to a vehicle wheel, and a radially outwardly extending hub flange from the cylindrical body; and an annular rotor body comprising a radially internal circumferential surface with a flange, the body extending to an external diameter with an external circumferential surface and having parallel opposing body surfaces for frictional engagement in braking of the vehicle wheel, the rotor body comprising at least one annular insert between the parallel body surfaces and constructed and arranged to provide coulomb friction damping; further comprising a coating comprising refractory particles over the insert.

* * * * *